Patented Oct. 5, 1926.

1,601,749

UNITED STATES PATENT OFFICE.

LEOPOLD WEIL, OF HAMBURG, GERMANY.

PROCESS OF OBTAINING PURE ANTHRACENE AND CARBAZOL FROM CRUDE ANTHRACENE.

No Drawing. Application filed December 26, 1923, Serial No. 682,794, and in Germany January 30, 1923.

This invention has reference to a process of manufacturing substantially pure anthracene and substantially pure carbazol from crude anthracene by a distillation process, by means of which particularly pure products are obtained and the course of manufacure is considerably facilitated and accelerated. My present invention is a further improvement of the method set forth in U. S. Patent 1,419,186 granted to me and in which a method for the manufacture of high-percentage anthracene has been described. The anthracene obtained by the previous method referred to shows a degree of purity of about 73 per cent; it contains moreover carbazol. Upon continuing my researches in this direction I have ascertained that it is possible to so perfect the process of manufacture as to obtain anthracene free from carbazol, and on the other hand to manufacture a carbazol which is free from anthracene. If the vapors obtained in the distillation with highly boiling substances, such as highly boiling hydrocarbons are allowed to pass in a suitable manner over alkali metal hydroxide the carbazol contained in the vapors is combined with the alkali metal hydroxide, while from the distillate that has been distilled off anthracene is obtained in crystals free from carbazol and of a degree of purity of more than 90 per cent. The carbazol has become combined with the alkali metal hydroxide forming alkali metal carbazolate from which carbazol is obtained by decomposition of the alkali metal compound; it is then purified by distillation with gas oil or by crystallization.

The following examples will more clearly illustrate the invention:

*Example I.*—500 kilograms of crude anthracene are heated with 500 kilograms of gas oil; the distillation commences at about 250 degrees C. The vapors of distillation are allowed to pass into a revolving tube charged with granulated caustic potash the temperature of which is kept at 150 to 160 degrees C. In the course of the distillation the caustic potash gradually assumes a reddish brown coloration, which indicates the formation of potassium carbazolate. The carbazol is thereby separated from the anthracene which leaves the tube with the gas oil, and distils over into a receiver in which the pure anthracene crystallizes out from the distillate. The contents of the tube remaining therein and consisting of potassium carbazolate and some free caustic potash are dissolved in water, boiled, and the carbazol precipitated thereby which is filtered and dried. By distilling the carbazol once, for instance in presence of highly boiling hydrocarbons as a vehicle, or crystallization the carbazol is obtained of a very high degree of purity.

*Example II.*—500 kilograms crude anthracene are distilled as in the previous example with gas oil, and the vapors of distillation are passed through fused caustic potash the temperature of which has been kept at 260 to 300 degrees. Otherwise proceed as in the previous example.

While in my prior patent above referred to a product is obtained consisting mainly of pure anthracene and carbazol, the process according to my present invention comprises also the separation of anthracene from carbazol with the additional improvement that both substances are eliminated at very high degrees of purity, considerably above 90 per cent, so that an important advance is realized as compared with my prior patent.

I am aware that it has already been suggested to remove the impurities from hydrocarbon vapors in distillation processes by treatment with solid binding agents. While, however, in the previous art disclosed the vapors of distillation are caused to pass through porous absorbing substances, that is to say by a merely mechanical procedure, the process according to my present invention is directed to a chemical action by the chemical combination of the carbazol vapors with the alkali metal hydroxide, and by means of this chemical mode of separation a carbazol compound is obtained that can be easily manipulated, and by means of the process according to my present invention it is possible to manufacture anthracene of more than 90 per cent purity and carbazol of high degrees of purity in one continuous operation.

The invention has been hereinbefore described in its broad aspects and it should be understood that it may be modified and varied, and equivalents may be used to suit varying conditions of application of the invention, and without deviating from the spirit thereof, as herein set forth and pointed out in the claims hereunto appended.

I claim:—

1. The process of manufacturing substantially pure ant
alkali metal
submitting c
cene in mi
between 2
thereby di
gether wi
ing the
hydroxi
as alkali
cene and
2. The
tially